(12) United States Patent
Jiang et al.

(10) Patent No.: US 10,764,577 B2
(45) Date of Patent: Sep. 1, 2020

(54) NON-MPM MODE CODING FOR INTRA PREDICTION IN VIDEO CODING

(71) Applicants: Futurewei Technologies, Inc., Plano, TX (US); Santa Clara University, Santa Clara, CA (US)

(72) Inventors: Minqiang Jiang, Campbell, CA (US); Taru Kanchan, San Jose, CA (US); Jianhua Zheng, Beijing (CN); Nam Ling, San Jose, CA (US); Chen-Xiong Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 0 days.

(21) Appl. No.: 16/664,601

(22) Filed: Oct. 25, 2019

(65) Prior Publication Data

US 2020/0137385 A1 Apr. 30, 2020

Related U.S. Application Data

(60) Provisional application No. 62/750,649, filed on Oct. 25, 2018.

(51) Int. Cl.
| | |
|---|---|
| *H04N 19/11* | (2014.01) |
| *H04N 19/139* | (2014.01) |
| *H04N 19/182* | (2014.01) |
| *H04N 19/52* | (2014.01) |
| *H04N 19/159* | (2014.01) |

(52) U.S. Cl.
CPC ......... *H04N 19/11* (2014.11); *H04N 19/139* (2014.11); *H04N 19/159* (2014.11); *H04N 19/182* (2014.11); *H04N 19/52* (2014.11)

(58) Field of Classification Search
CPC .... H04N 19/11; H04N 19/159; H04N 19/182; H04N 19/52; H04N 19/139
USPC ...................................... 375/240.02
See application file for complete search history.

(56) References Cited

U.S. PATENT DOCUMENTS

2019/0289301 A1* 9/2019 Lim ................... H04N 19/105

* cited by examiner

*Primary Examiner* — Allen C Wong
(74) *Attorney, Agent, or Firm* — Fish & Richardson P.C.

(57) ABSTRACT

Methods, systems, and apparatus, including computer programs encoded on computer storage media, for performing intra coding predictions. An intra-coding process applied to pixels in a frame of media is determined. The intra-coding process is determined whether to corresponding to at least one of most probable modes. In response to determining the intra-coding process does not correspond to the at least one of the most probable modes, four angular prediction modes are extracted from a list of prediction modes. A set of candidates based on the four angular prediction modes are determined. A pre-defined order of the set of candidates is determined, wherein each candidate mode of the set of candidate modes is included in a ranked order and signaled with a particular fixed length coding, and wherein a length of the particular fixed length coding increases based on the pre-defined order of the set of candidate modes.

20 Claims, 13 Drawing Sheets

NON-MPM MODE CODING FOR INTRA PREDICTION IN VIDEO CODING

CROSS REFERENCE TO RELATED APPLICATIONS

The present application claims priority to U.S. Provisional Patent Application No. 62/750,649 filed on Oct. 25, 2018, which is incorporated herein by reference in its entirety.

BACKGROUND

In video coding, High Efficiency Video Coding (HEVC) introduced 35 intra prediction modes. It employed a three most probable modes (MPM) based method to improve intra mode coding. This method significantly improved the performance by extracting three MPMs out of the 35 intra modes. Joint Video Exploration Team (JVET) defines 67 intra prediction modes for a possible future video coding standard. In the latest JVET development, six MPMs are chosen, and the remaining sixty-one modes (called Non-MPM modes) are divided into 16 "selected" and 45 "non-selected" modes.

SUMMARY

This specification describes techniques for improving encoding predictions in HEVC. In particular, the techniques analyze the 67 intra prediction modes for a video coding standard and select six most probable modes from the 67 intra prediction modes. The remaining 61 modes, e.g., Non-MPM modes, are divided into 16 "selected" and 45 "non-selected" modes. The techniques of this disclosure select and order the remaining 61 Non-MPM modes based on probability statistics. In some implementations the modes that fall into the selected category are coded using shorter codes and non-selected modes are coded using longer codes. These codes are signaled to the decoder for knowing the proper decoding technique to apply.

In one general aspect, a method includes: determining, by one or more processors, an intra-coding process applied to pixels in a frame of media; determining, by the one or more processors, whether the intra-coding process corresponds to at least one of most probable modes; in response to determining the intra-coding process does not correspond to the at least one of the most probable modes, extracting, by the one or more processors, four angular prediction modes from a list of prediction modes; determining, by the one or more processors, a set of candidate modes based on the four angular prediction modes; and determining, by the one or more processors, a pre-defined order of the set of candidate modes, wherein each candidate mode of the set of candidate modes is included in a ranked order and signaled with a particular fixed length coding, and wherein a length of the particular fixed length coding increases based on the pre-defined order of the set of candidate modes.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes the four angular prediction modes correspond to angular directions from a list of directional prediction modes.

In some implementations, determining the pre-defined order of the set of candidate modes further includes: generating, by the one or more processors, a statistical matrix for the pre-defined order in response to determining the intra-coding process does not correspond to the at least one of the most probable modes.

In some implementations, wherein the generated statistical matrix further includes applying, by the one or more processors, the candidate mode to each column of the statistical matrix; applying, by the one or more processors, a different intra prediction mode to each row of the statistical matrix, wherein the different intra prediction mode corresponds to one of sixty one non-most probable modes; and applying, by the one or more processors, a number of times each of the candidate modes corresponds to a current mode for previous frames of media to each cell in the statistical matrix.

In some implementations, determining the pre-defined order of the set of candidate modes includes: summing, by the one or more processors, the number of times each of the candidate modes corresponds to the current mode for each candidate mode; and sorting, by the one or more processors, the candidate modes based on most occurring candidate mode to a least occurring candidate mode.

In some implementations, wherein determining the pre-defined order of the set of candidate modes includes: signaling, by the one or more processors, each candidate mode of the set of candidate modes in the ranked order with the particular fixed length coding to a decoder for decoding the frame of media.

In some implementations, the at least one of most probable modes include a DC mode and a planar mode.

In some implementations, the length of the particular fixed length coding increases based on the pre-defined order of the set of candidates and comprises four bits, five bits, and six bits.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
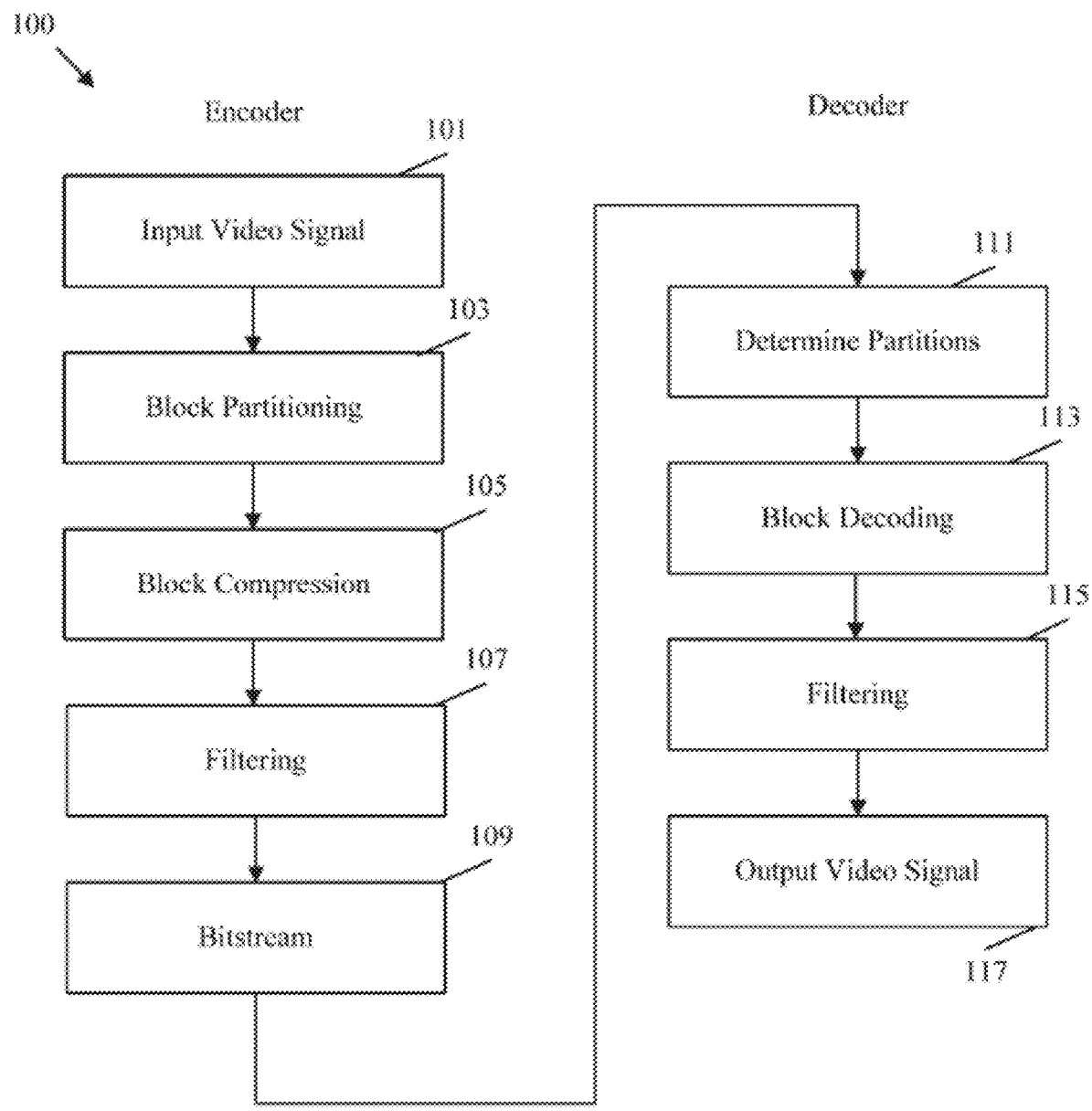
FIG. 1 is a flowchart of an example method of coding a video signal.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three-dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence, the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block-based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and SAO filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks. The in-loop filtering process is discussed in detail below.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block-partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words, as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artefacts. Once the frames are filtered, the video signal can be output to a display at step 117 for viewing by an end user.

Figure 2:
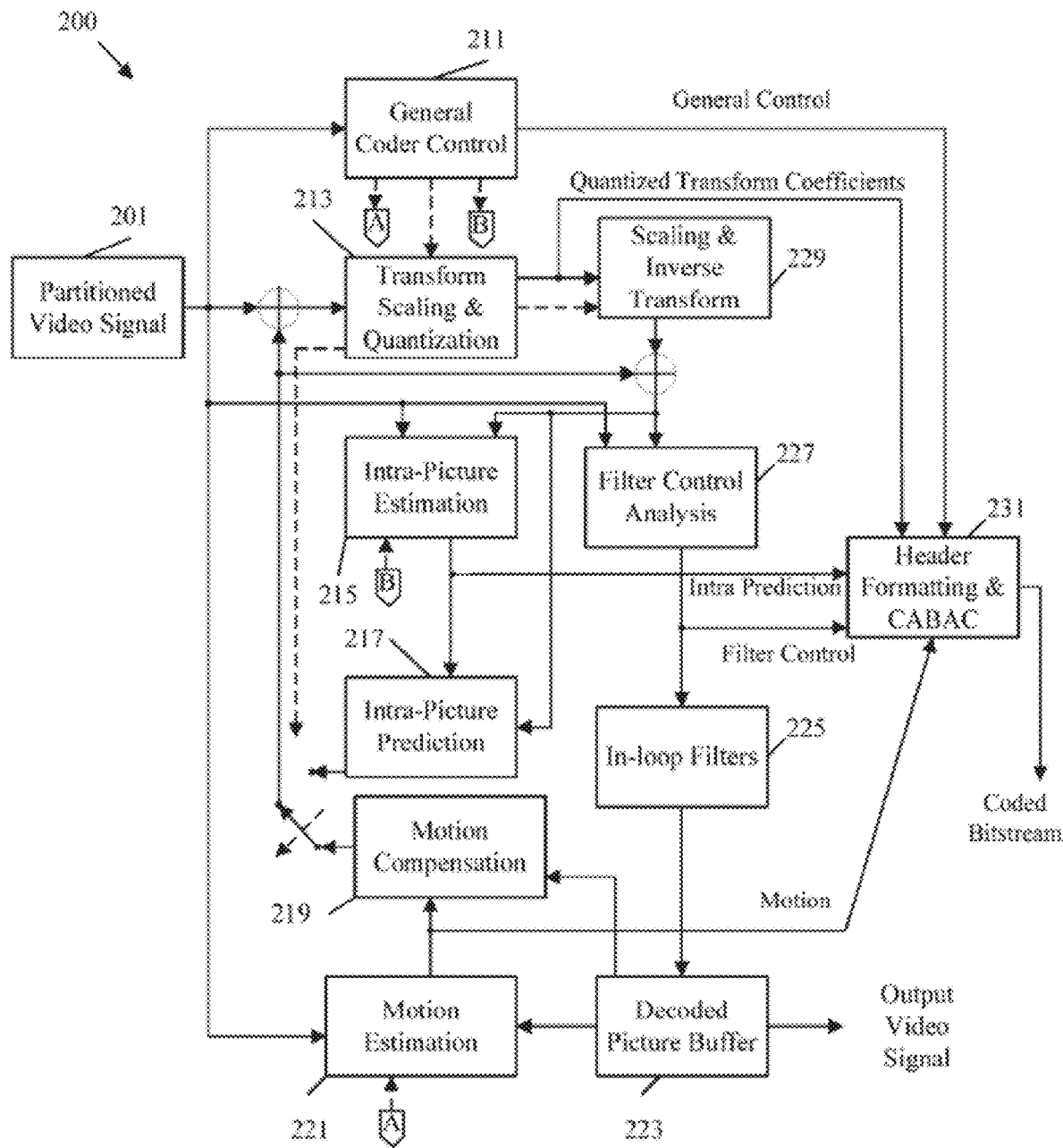
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filter component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder controls component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bit rate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth-modeling mode (DMM) based on rate-distortion optimization (RDO).

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms, or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, and syntax-based context adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
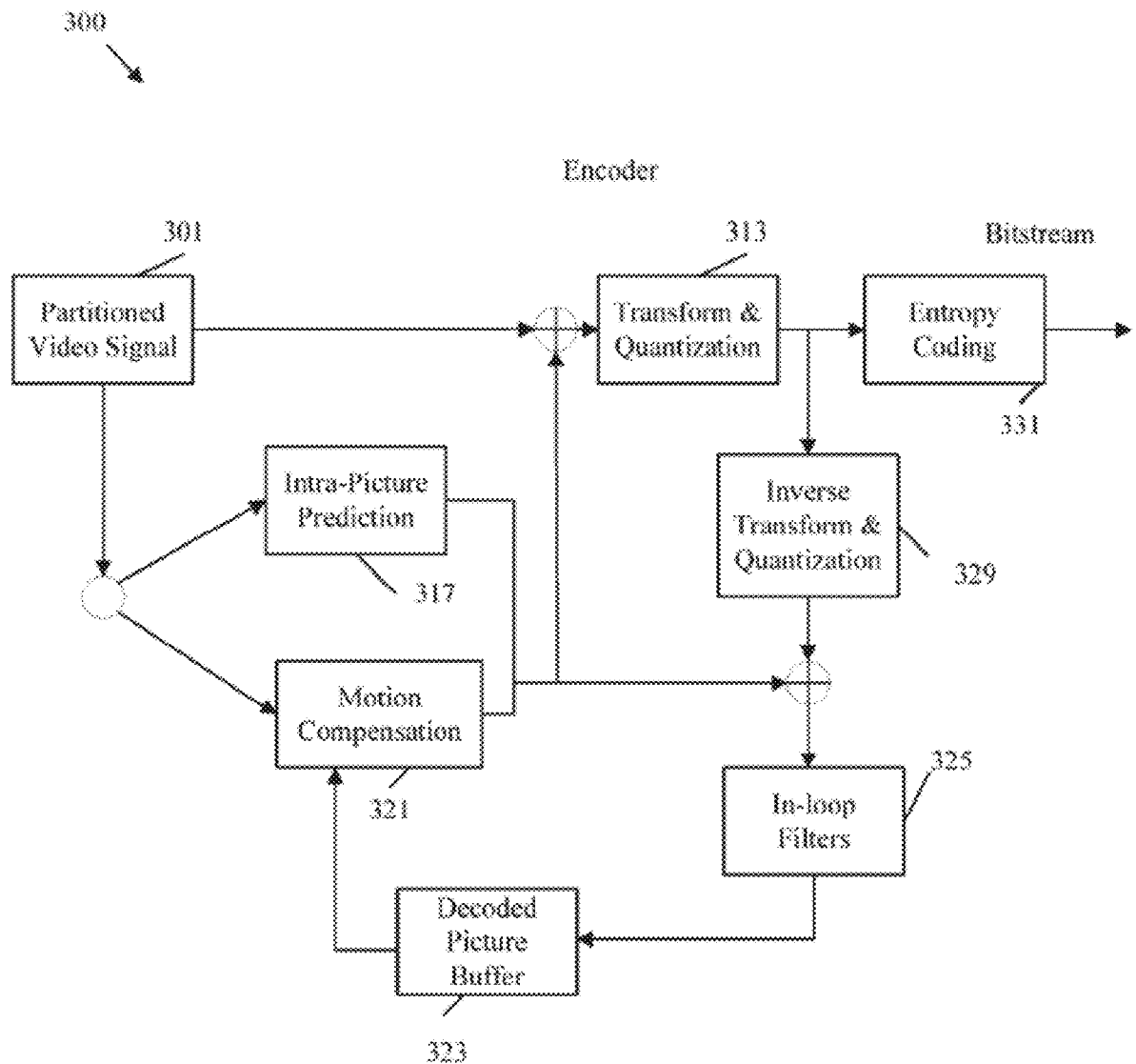
FIG. 3 is a block diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy-coding component 331 for coding into a bitstream. The entropy-coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use a reference blocks by the motion compensation component 321. The decoded picture buffer 323 may be substantially similar to the decoded picture buffer 223.

Figure 4:
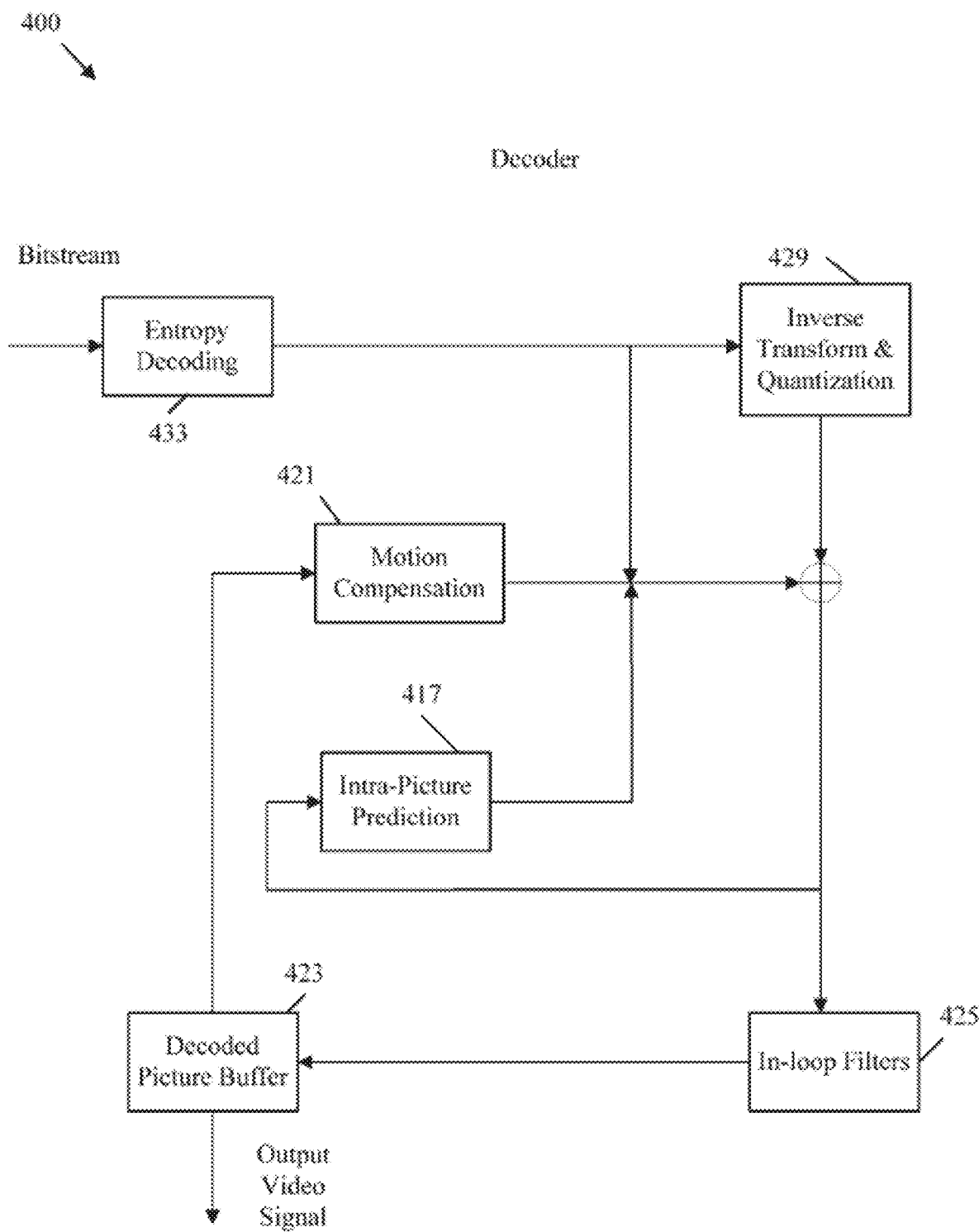
FIG. 4 is a block diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy-decoding component 433 performs the reverse function of the entropy-encoding component 331. The entropy-decoding component 433 is configured to implement an entropy-decoding scheme, such as CAVLC, CABAC, SBAC, and PIPE coding or other entropy coding technique. For example, the entropy-decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operate in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filter the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Inter-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame).

Inter-prediction is employed when a coding object, such as a coding tree unit (CTU), a coding tree block (CTB), a coding unit (CU), a sub-CU, etc., appears in multiple frames of a video sequence. Rather than coding the same object in each frame, the object is coded in a reference frame and a motion vector (MV) is employed to indicate a motion trajectory of an object. The motion trajectory of an object is the object's movement over time. An MV is a vector that indicates a direction and magnitude of an objects change in position between frames. The object and the MV can be coded in a bitstream and decoded by a decoder. In an effort to further increase coding efficiency and reduce the size of the encoding, the MV may be omitted from the bitstream and derived at the decoder. For example, a pair of reference frames may be employed. A reference frame is a frame in a bitstream that includes data that can be coded by reference when coding related frames. Matching algorithms, such as bi-lateral matching and/or template matching may be employed to determine the position of the coding object in both reference frames. A bi-lateral matching algorithm matches a block in a previous frame to a block in a current frame. A template-matching algorithm matches adjacent blocks to a current block with adjacent blocks to the current block in one or more reference frames. Once the position of the object is determined in both reference frames, an MV can be determined that represents the motion of the object between the reference frames. The MV can then be employed to position the object in the frames between the reference frames. As a specific example, an initial MV can be determined for an entire CU. A local search can then be employed to refine the initial MV. Further, MVs for sub-CU components of the object can be determined and refined based on the refined initial MV. Such an approach indicates the correct position of the object so long as the motion trajectory of the object is continuous between the reference frames.

Figure 5:
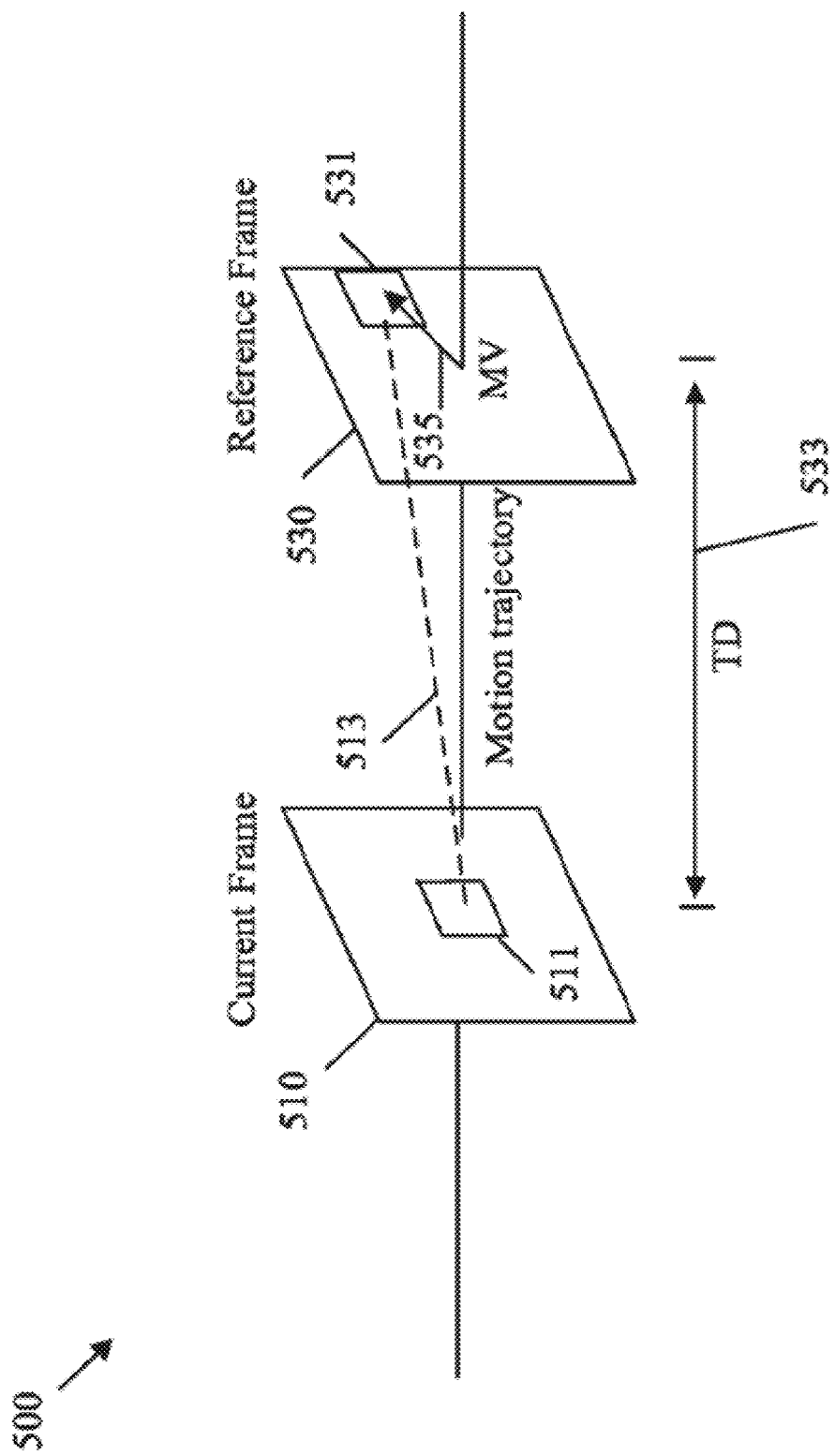
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421.

Unidirectional inter-prediction 500 employs a reference frame 530 with a reference block 531 to predict a current block 511 in a current frame 510. The reference frame 530 may be temporally positioned after the current frame 510 as shown, but may also be temporally positioned before the current frame 510 in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510.

The current block 511 is any coding unit that is being encoded/decoded at a specified point in the coding process. The current block 511 may be an entire partitioned block, or may be a sub-block in the affine inter-prediction case. The current frame 510 is separated from the reference frame 530 by some temporal distance (TD) 533. The TD 533 indicates an amount of time between the current frame 510 and the reference frame 530 in a video sequence. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded MV 535 and a reference block 531 provides information sufficient to reconstruct a current block 51 land position the current block 511 in the current frame 510.

Figure 6:
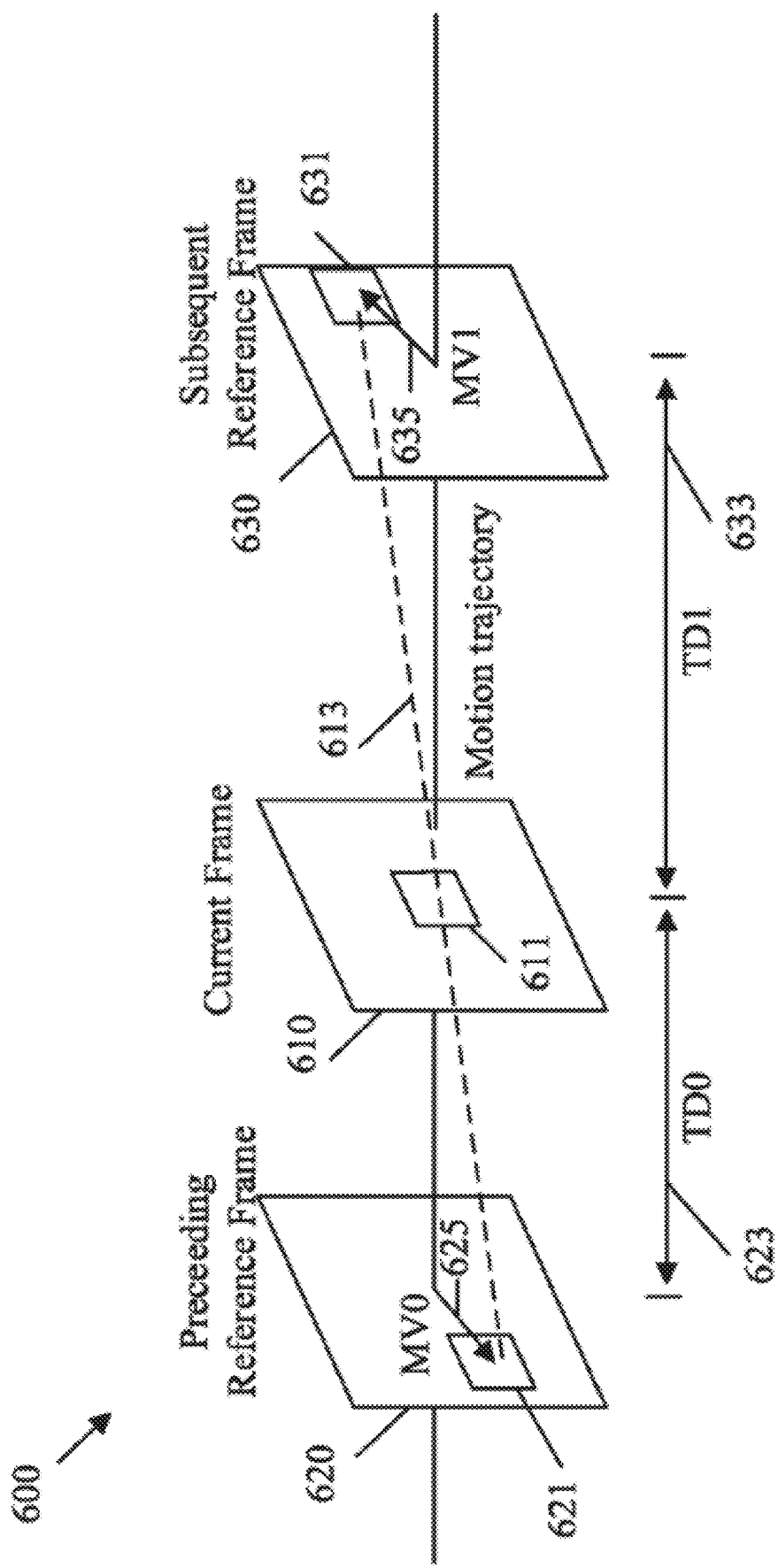
FIG. 6 is a schematic diagram illustrating an example of bidirectional inter-prediction

FIG. 6 is a schematic diagram illustrating an example of bidirectional inter-prediction 600, for example, as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence, current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence. The TD1 633 indicates an amount of time between the current frame 610 and the subsequent reference frame 630 in the video sequence. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time indicated by TD1 633.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631, MV0 625, and MV1 635.

Intra-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame). In intra-prediction, a current image block is predicted from a reference line of samples. The reference line includes samples from adjacent image blocks, also called neighbor blocks. Samples from the current block are matched with samples from the reference line with the nearest luma (light) or chroma (color) values. The current block is coded as prediction modes that indicate the matching samples. The prediction modes include angular prediction modes, direct current (DC) mode, and planar mode. Differences between values predicted by the prediction modes and actual values are coded as residual values in a residual block.

Figure 7:
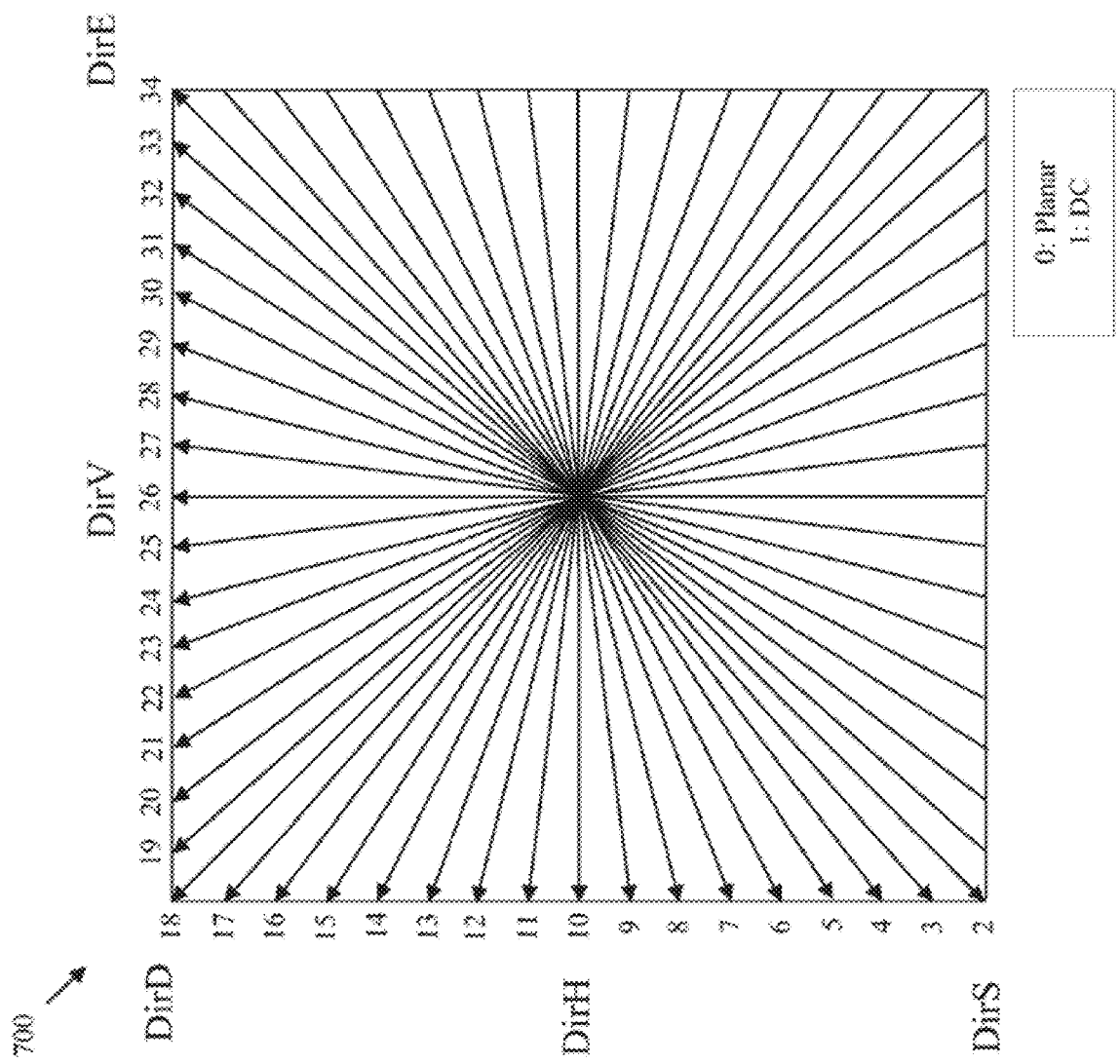
FIG. 7 is a schematic diagram illustrating example intra-prediction modes employed in video coding.

FIG. 7 is a schematic diagram illustrating example intra-prediction modes 700 employed in video coding. For example, intra-prediction modes 700 may be employed by steps 105 and 113 of method 100, intra-picture estimation component 215, and an intra-picture prediction component 217 of codec system 200, intra-picture prediction component 317 of encoder 300, and/or intra-picture prediction component 417 of decoder 400. Specifically, intra-prediction modes 700 can be employed to compress an image block into a prediction block containing a selected prediction mode and a remaining residual block.

As noted above, intra-prediction involves matching a current image block to a corresponding sample or samples of one or more neighboring blocks. The current image block can then be represented as a selected prediction mode index and a residual block, which is much smaller than representing all of the luma/chroma values contained in the current image block. Intra-prediction can be used when there is no available reference frame, or when inter-predication coding is not used for the current block or frame. The reference samples for intra-prediction may be derived from previously coded (or reconstructed) neighboring blocks in the same frame. Advanced Video Coding (AVC), also known as H.264 and H.265/HEVC both employ a reference line of boundary samples of adjacent blocks as reference sample for intra-prediction. In order to cover different textures or structural characteristics many different intra-prediction modes are employed. H.265/HEVC supports thirty-five intra-prediction modes 700 that spatially correlate a current block to one or more reference samples. Specifically, intra-prediction modes 700 include thirty-three directional prediction modes indexed as modes two through thirty-four, a DC mode indexed as mode one and a planar mode indexed as mode zero.

During encoding, the encoder matches the luma/chroma values of a current block with the luma/chroma values of corresponding reference samples in a reference line across the edges of neighboring blocks. When the best match is found with one of the reference lines, the encoder selects one of the directional intra-prediction modes 700 that points to the best matching reference line. For clarity of discussion, acronyms are employed below to reference particular directional intra-prediction modes 700. DirS denotes the starting directional intra-prediction mode when counting clockwise from the bottom left (e.g., mode two in HEVC). DirE denotes the ending directional intra-prediction mode when counting clockwise from the bottom left (e.g., mode thirty-four in HEVC). DirD denotes the middle directional intra coding mode when counting clockwise from the bottom left (e.g., mode eighteen in HEVC). DirH denotes a horizontal intra prediction mode (e.g., mode ten in HEVC). DirV denotes a vertical intra prediction mode (e.g., mode twenty-six in HEVC).

As discussed above, DC mode acts as a smoothing function and derives a prediction value of a current block as an average value of all the reference samples in the reference line traversing the neighboring blocks. Also as discussed above, planar mode returns a prediction value that indicates a smooth transition (e.g., constant slope of values) between samples at the bottom and top left or top left and top right of the reference line of reference samples.

For Planar, DC, and prediction modes from DirH to DirV, the samples in both the top row of the reference line and the left column of the reference line are used as reference samples. For prediction modes with prediction directions from DirS to DirH (including DirS and DirH), the reference samples in the previously coded and reconstructed neighboring blocks on the left column of the reference line are used as reference samples. For prediction modes with prediction directions from DirV to DirE (including DirV and DirE), the reference samples of the previously coded and reconstructed neighboring blocks on the top row of the reference line are used as reference samples.

Figure 8:
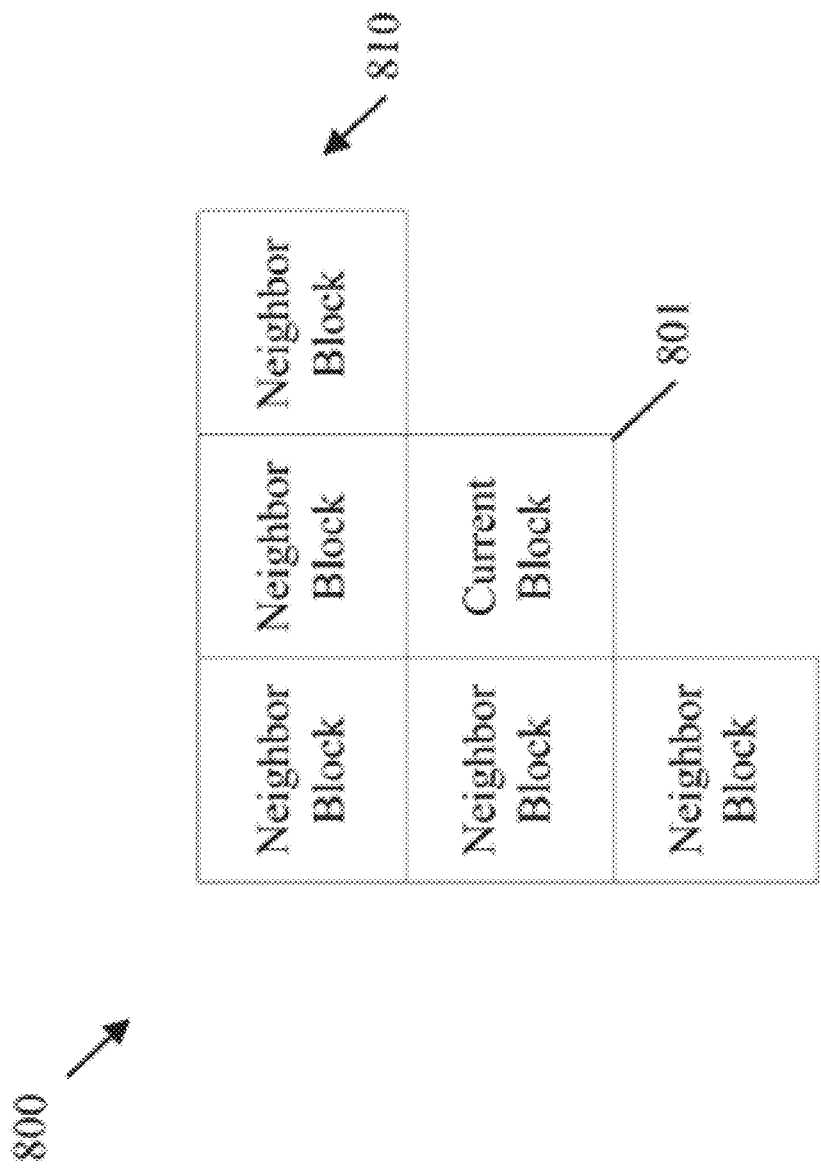
FIG. 8 is a schematic diagram illustrating an example of directional relationships of blocks in video coding.

FIG. 8 is a schematic diagram illustrating an example of directional relationships of blocks 800 in video coding. For example, the blocks 800 may be employed when selecting intra-prediction modes 500. Hence, blocks 800 may be employed by steps 105 and 113 of method 100, intra-picture estimation component 215, and an intra-picture prediction component 217 of codec system 200, intra-picture prediction component 317 of encoder 300, and/or intra-picture prediction component 417 of decoder 400. In video coding, blocks 800 are partitioned based on video content and hence may include many rectangles and squares of varying shapes and sizes. Blocks 800 are depicted as squares for purposes of explanation and are hence simplified from actual video coding blocks to support clarity of discussion.

The blocks 800 contain a current block 801 and neighbor blocks 810. The current block 810 is any block being coded at a specified time. The neighbor blocks 810 are any blocks immediately adjacent to the left edge or top edge of the current block 801. Video coding generally proceeds from top left to bottom right. As such, the neighbor blocks 810 may be been encoded and reconstructed prior to coding of the current block 801. When coding the current block 801, the encoder matches the luma/chroma values of the current block 801 with a reference sample (or samples) from a reference line traversing the edges of the neighboring blocks 810. The match is then employed to select an intra-prediction mode, for example from intra-prediction modes 700 that point to the matched sample (or samples when DC or planar mode is selected). The selected intra-prediction mode then indicates that the luma/chroma values of the current block 801 are substantially similar to the reference sample corresponding to selected intra-prediction mode. Any differences can be retained in a residual block. The selected intra-prediction mode is then encoded in a bitstream. At the decoder, the current block 801 can be reconstructed by employing the luma/chroma values of the reference samples in the selected reference line in the neighboring block 810 that corresponds to the selected intra-prediction mode (along with any residual information from the residual block).

In-Loop Filters

Video coding schemes subdivide video signals into image frames, and then subdivide the image frames into various types of blocks. The image blocks are then compressed. This approach may create visual artefacts when the compressed video signal is reconstructed and displayed. For example, the image compression process can artificially add blocky shapes. This is known as blocking, and generally occurs at block partition boundaries. In addition, non-linear signal dependent rounding error, known as quantization noise, may also be artificially added to a compressed image. Various filters may be employed to correct for such artefacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering so that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop, filtering employs several filters such as a deblocking filter, a sample adaptive offset (SAO) filter, and an adaptive loop filter. In-loop filtering can also include a noise suppression filter.

Figure 9:
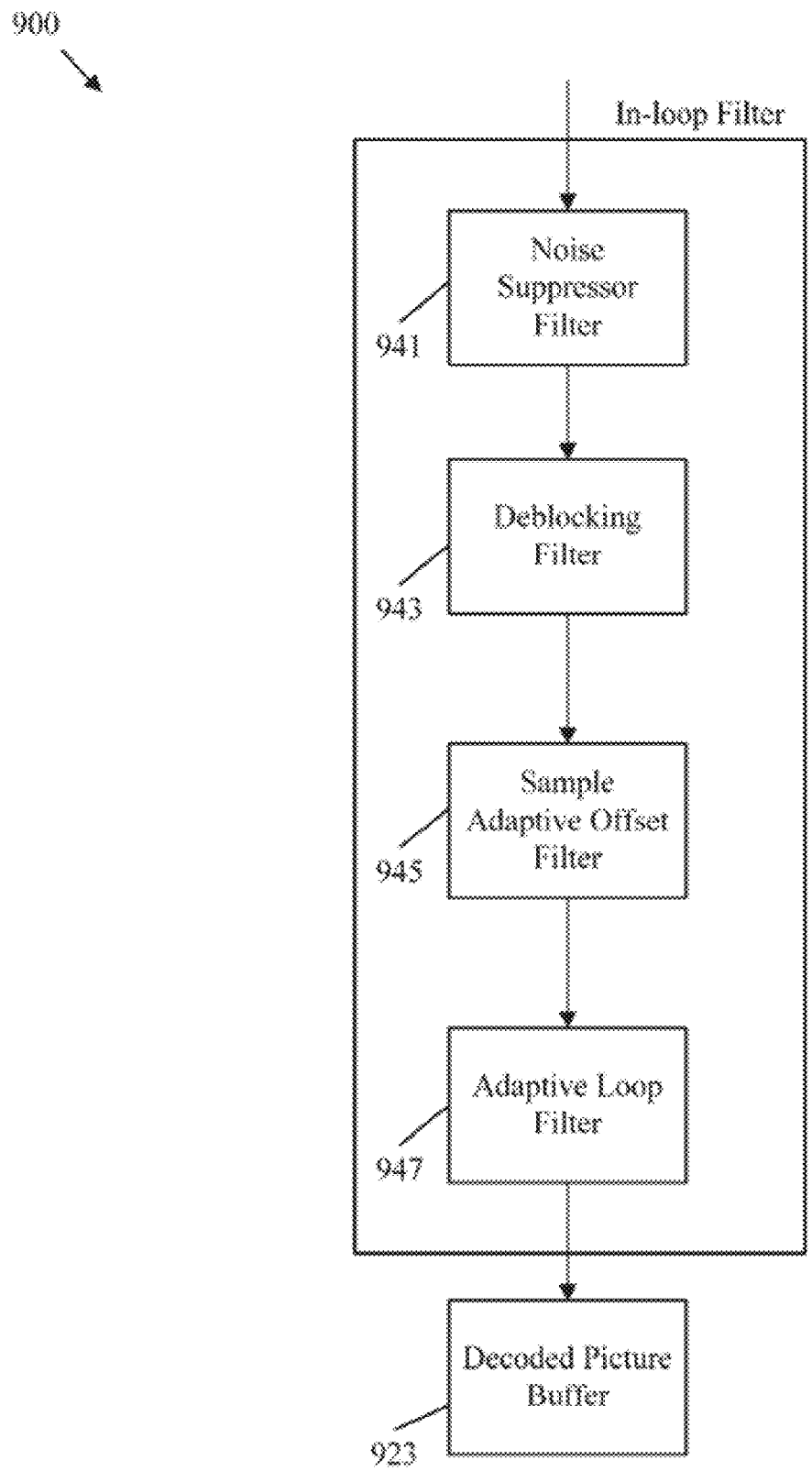
FIG. 9 is a block diagram illustrating an example in-loop filter.

FIG. 9 is a block diagram illustrating an example in-loop filter 900. In-loop filter 900 may be employed to implement in-loop filters 225, 325, and/or 425. The in-loop filter 900 includes a noise suppression filter 941; a deblocking filter 943, a sample adaptive offset (SAO) filter 945, and an adaptive loop filter 947. The filters of in-loop filter 900 are applied in sequence to reconstructed image blocks and/or a residual block.

The noise suppression filter 941 is configured to remove quantization noise caused by image compression. Specifically, the noise suppression filter 941 is employed to remove artefacts that occur at edges in the image. For example, image compression may create distinct and incorrect color/light values adjacent to sharp transitions (edges) between different color/light patches in an image. This is referred to as ringing, and is caused by application of transforms to high frequency portions of the image data that are associated with sharp edges. The noise suppression filter 941 is employed to mitigate such ringing artefacts. The noise suppression filter 941 operates in both the spatial domain (e.g., spatial orientation of pixels) and the frequency domain (e.g., relationship of transformed coefficient values relating to pixel data). At the encoder, the noise suppression filter 941 partitions a reconstructed frame into reference macroblocks. Such blocks can also be sub-divided into smaller reference blocks. The noise suppression filter 941 first generates an application map indicating the portions of the frame that should be filtered based on an estimated amount of quantization noise at the block. The noise suppression filter 941 then employs a matching component to determine, for each reference block as indicated by the application map, a set of patches that are similar to the corresponding reference block, where similar indicates chroma/luma values are within a predetermined range. The noise suppression filter 941 then groups the patches into clusters and may employ a two dimensional (2D) transform to transform the clusters into the frequency domain resulting in frequency domain patches. The noise suppression filter 941 may also employ a reverse 2D transform to convert the frequency domain patches back into the spatial domain.

The deblocking filter 943 is configured to remove block shaped edges created by the blocked based inter and intra prediction. The deblocking filter 943 scans an image portion (e.g., image slice) for discontinuities in chroma and/or luma values occurring at partition boundaries. The deblocking filter 943 then applies a smoothing function to the block boundaries to remove such discontinuities. The strength of the deblocking filter 943 may be varied depending on the spatial activity (e.g., variance of luma/chroma components) occurring in an area adjacent to the block boundaries.

The SAO filter 945 is configured to remove artefacts related to sample distortion caused by the encoding process. The SAO filter 945 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 945 at the decoder. The SAO filter 945 removes banding artefacts (bands of values instead of smooth transitions) and ringing artefacts (spurious signals near sharp edges).

The adaptive loop filter 947, at the encoder, is configured to compare a reconstructed image to an original image. The adaptive loop filter 947 determines coefficients that describe the differences between the reconstructed image and the original image, for example via a Wiener based adaptive filter. Such coefficients are encoded in the bitstream and employed at the adaptive loop filter 947 at the decoder to remove the differences between the reconstructed image and the original image. While the adaptive loop filter 947 is effective in correcting artefacts, greater differences between the reconstructed image and the original image result in a greater number of coefficients to be signaled. This in turn creates a larger bitstream and hence reduces the effectiveness of compression. As such, minimization of differences by other filters prior to applying the adaptive loop filter 947 results in improved compression.

Partitioning

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. At an encoder, a video signal is separated into frames. Frames are then partitioned into image blocks containing groups of pixels. The image blocks are then compressed, filtered, and encoded into a bitstream. The bitstream may then be transmitted to a decoder, which reconstructs the video signal for display to an end user.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes. Such application of the split modes result in various partition patterns.

Figure 10:
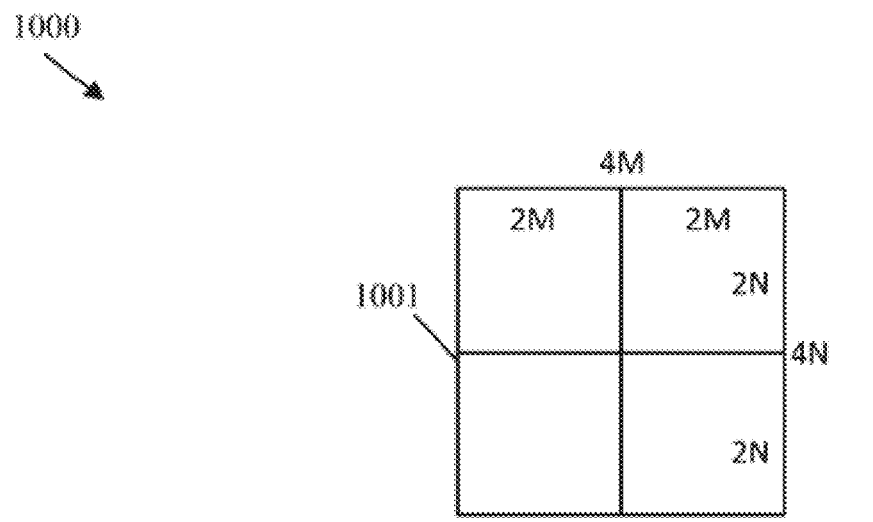
FIG. 10 illustrates example split modes employed in block partitioning.
Figure 10:
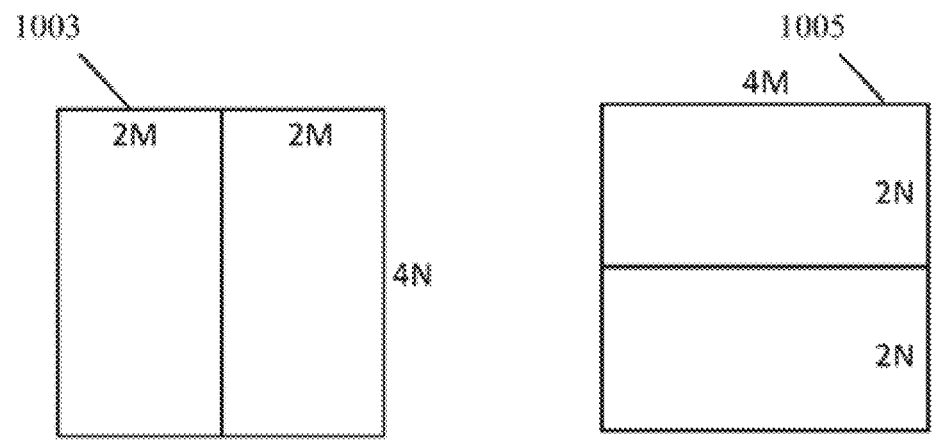
Figure 10:
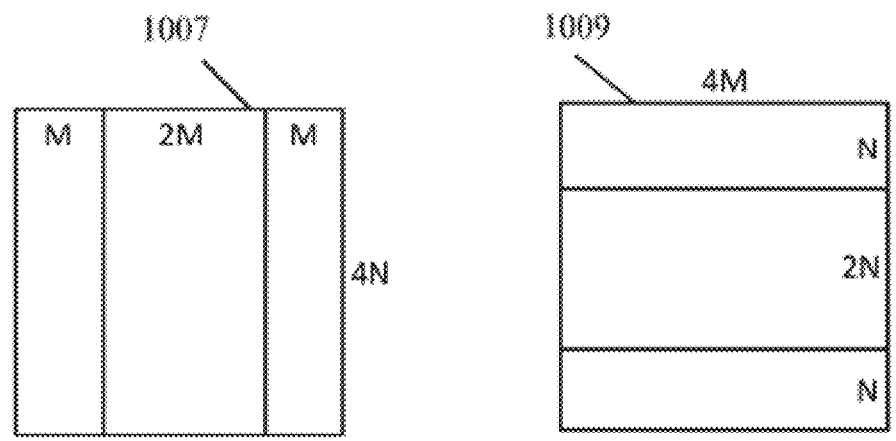

FIG. 10 illustrates example split modes 1000 employed in block partitioning. A split mode 1000 is a mechanism to split a parent node (e.g., an image block) into a plurality of child nodes (e.g., image sub-blocks) during partitioning. Split modes 1000 include a quad-tree (QT) split mode 1001, a vertical binary tree (BT) split mode 1003, a horizontal BT split mode 1005, a vertical triple tree (TT) split mode 1007, and a horizontal TT split mode 1009. The QT split mode 1001 is a tree structure for block partitioning in which a node of size 4M×4N is split into four child nodes of size M×N, where M indicates block width and N indicates block height. The vertical BT split mode 1003 and horizontal BT split mode 1005 are tree structures for block partitioning in which a node of size 4M×4N is vertically split into two child nodes of size 2M×4N or horizontally split into two child nodes of size 4M×2N, respectively. The vertical TT split mode 1007 and horizontal TT split mode 1009 are tree structures for block partitioning in which a node of size 4M×4N is vertically split into three child nodes of size M×4N, 2M×4N and M×4N; or horizontally split into three child nodes of size 4M×N, 4M×2N and 4M×N, respectively. Among the three child nodes, the largest node is positioned in the center.

Split modes 1000 may also be applied recursively to further divide the blocks. For example a quad-tree binary-tree (QT-BT) can be created by partitioning a node with QT split mode 1001, and then partitioning each child node (sometimes referred to as quad-tree leaf nodes) with a vertical BT split mode 1003 and/or a horizontal BT split mode 1005. Further, a quad-tree triple tree (QT-TT) can be created by partitioning a node with a quad-tree split, and then partitioning the resulting child nodes with the vertical TT split mode 1007 and/or the horizontal TT split mode 1009.

HEVC operates on a Joint Exploration Model (JEM) application. In JEM, QT-BT block partitioning is employed to partition a coding tree unit (CTU) into a plurality of blocks. TT block partitioning has also been proposed for inclusion into JEM to further enrich block partition types. In video coding based on QT, QT-BT, QT-TT block partitioning split modes, a coding or prediction block in depth K may be split into a number N of smaller coding or prediction blocks of depth K+1 by a BT, TT or QT split mode, where N is set to two, three, or four, respectively. The partition patterns of the split modes are shown in FIG. 10, with the partition patterns indicating the size and position of two or more child nodes split from a parent node.

Transform

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process.

For example, an encoder and a decoder may both employ a coding standard such as High efficiency video coding (HEVC), which is also known as H.265. H.265 are based on a prediction and transform framework. At an encoder, video files are separated into frames. Frames are then sub-divided into image blocks containing groups of pixels. Image blocks are further decomposed into prediction blocks containing prediction information, such as prediction modes and motion vector information, and residual blocks containing residual information, such as transform modes, transform coefficients, and quantization parameters.

A prediction block and a residual block employ less storage space than an image block, but can be employed by a decoder to reconstruct an image block. The prediction blocks and residual blocks are coded into a bitstream and transmitted to decoder and/or stored for later transmission upon request. At a decoder, the prediction information and the residual information are parsed. The parsed prediction information is then employed to generate prediction samples by employing intra-prediction or inter-prediction. Intra-prediction employs reconstructed image blocks to predict other image blocks in the same frame. Inter-prediction employs reconstructed image blocks to predict other image blocks between adjacent frames. Further, the residual information is employed to generate residual samples, for example by sequentially applying inverse quantization and inverse transforms. The prediction samples and the residual samples are combined to obtain reconstructed samples that correspond to the image blocks coded by the encoder (e.g., for display to an end user on a monitor).

Spatial varying transform (SVT) is a mechanism employed to further improve video coding efficiency. SVT employs a transform block to further compress the residual block. Specifically, a rectangular residual block include a width and height h (e.g., w×h). A transform block is selected that is smaller than the residual block. Hence, the transform block is employed to transform a corresponding part of the residual block, and leave the remainder of the residual block without additional coding/compression. The rationale behind SVT is that residual information may not be distributed evenly in a residual block. Using a smaller transform block with an adaptive position can capture the majority of the residual information in the residual block, without requiring the entire residual block be transformed. This approach may achieve better coding efficiency than transforming all the residual information in the residual block in some cases. As the transform block is smaller than the residual block, SVT employs a mechanism for signaling the position of the transform relative to the residual block. Such position signaling increases the overall signaling overhead of the coding process, and hence reduces the efficiency of the compression. Additionally, employing the same type of transform block in all cases may not lead to beneficial results in some cases.

Figure 11:
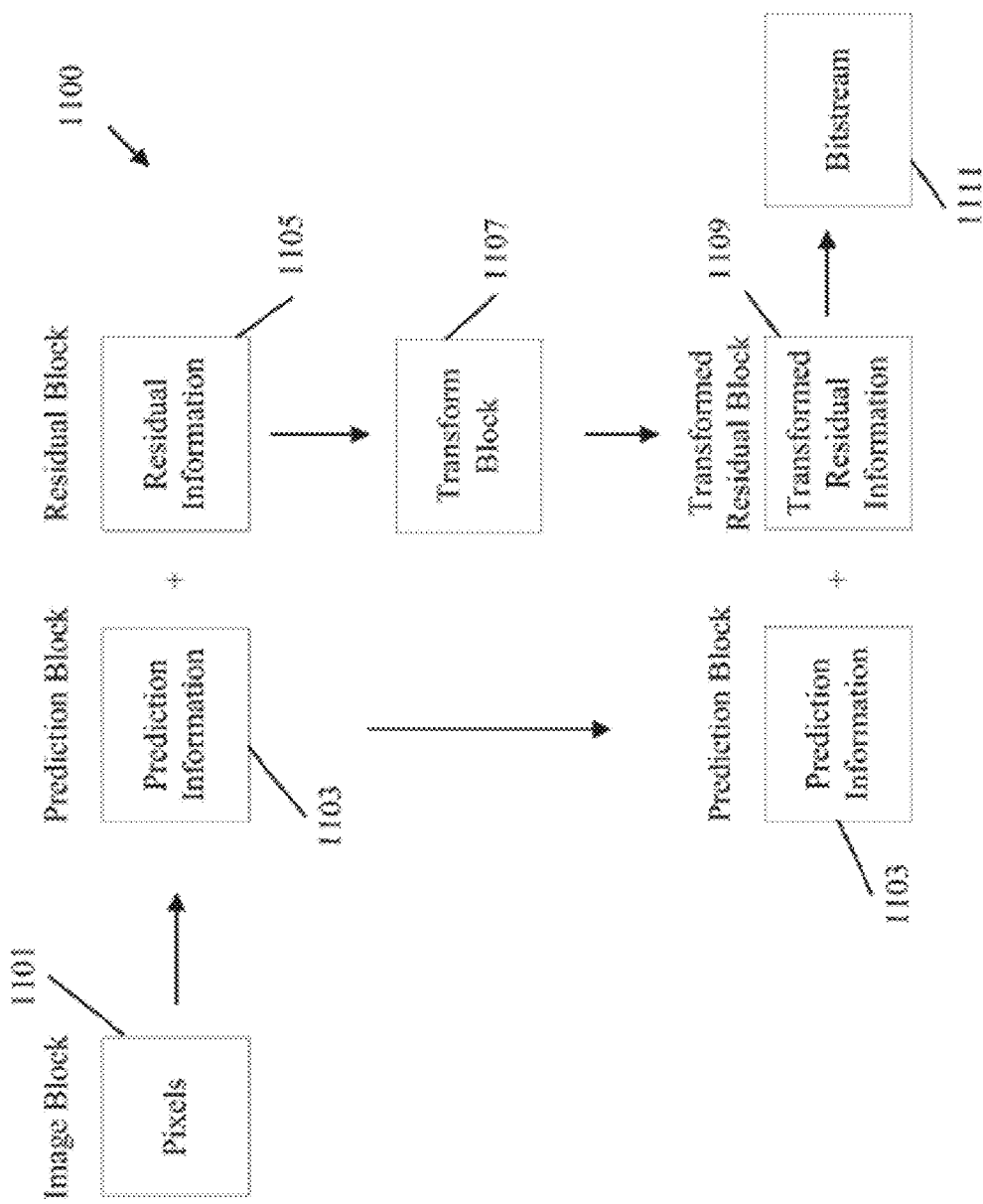
FIG. 11 is a schematic diagram of an example video encoding mechanism.

FIG. 11 is a schematic diagram of an example video encoding mechanism 1100. An encoder from one or more frames can obtain an image block 1101. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 1111. Accordingly, the image block 1101 is a partitioned portion of an image and contains pixels that represent luma components and/or chroma components at a corresponding portion of the image. During encoding, the image block 1101 is encoded as a prediction block 1103 containing prediction information such as prediction modes for intra-prediction and/or motion vectors for inter-prediction. Encoding the image block 1101 as a prediction block 1103 may then leave a residual block 1105 containing residual information indicating the difference between the prediction block 303 and the image block 301.

It should be noted that an image block 1101 might be partitioned as a coding unit that contains one prediction block 1103 and one residual block 1105. The prediction block 1103 may contain all prediction samples of the coding unit, and the residual block 1105 may contain all residual samples of the coding unit. In such a case, the prediction block 1103 is of the same size as the residual block 1105. In another example, the image block 1101 may be partitioned as a coding unit that contains two prediction blocks 1103 and one residual block 1105. In such a case, each prediction block 1103 contains a portion of the prediction samples of the coding unit, and the residual block 1105 contains all of the residual samples of the coding unit. In yet another example, the image block 1101 is partitioned into a coding unit that contains 2 prediction blocks 1103 and four residual blocks 1105. The partition pattern of the residual blocks 1105 in a coding unit may be signaled in the bitstream 1111. Such position patterns may include Residual Quad-Tree (RQT) in HEVC. Further, an image block 1101 may contain only luma components (e.g., light), denoted as Y components, of image samples (or pixels). In other cases, the image block 1101 may contain Y, U, and V components of image samples, where U and V indicate chrominance components (e.g., color) in a blue luminance and red luminance (UV) colorspace.

Transforms may be employed to further compress the information. Specifically, a transform block 1107 may be employed to further compress the residual block 1105. The transform block 1107 contains a transform, such as inverse Discrete Cosine Transform (DCT) and/or inverse Discrete Sine Transform (DST). The difference between the prediction block 1103 and the image block 1101 is the fit to the transform by employing transform coefficients. By indicating the transform mode of the transform block 1107 (e.g., inverse DCT and/or inverse DST) and the corresponding transform coefficients, the decoder can reconstruct the residual block 1105. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 1107 are stored as transformed residual information in a transformed residual block 1109, which may also be referred to simply as a residual block in some cases.

The prediction information of the prediction block 1103 and the transformed residual information of the transformed residual block 1109 can then be encoded in a bitstream 1111. The bitstream 1111 can be stored and/or transmitted to a decoder. The decoder can then perform the process in reverse to recover the image block 1101. Specifically, the decoder can employ the transformed residual information to determine the transform block 1107. The transform block 1107 can then be employed in conjunction with the transformed residual block 1109 to determine the residual block 1105. The residual block 1105 and the prediction block 1103 can then be employed to reconstruct the image block 1101. The image block 1101 can then be positioned relative to other decoded image blocks 1101 to reconstruct frames and position such frames to recover the encoded video.

It should be noted that some prediction blocks 1103 could be encoded without resulting in a residual block 1105. However, such a case does not result in the use of a transform block 1107 and hence is not discussed further. Transform blocks 1107 may be employed for inter-predicted blocks or intra-predicted blocks. Further, transform blocks 1107 may be employed on residual blocks 1105 generated by specified inter-prediction mechanisms (e.g., translation model based motion compensation), but may not be employed to residual blocks 1105 generated by other specified inter-prediction mechanisms (e.g., affine model based motion compensation).

Figure 12:
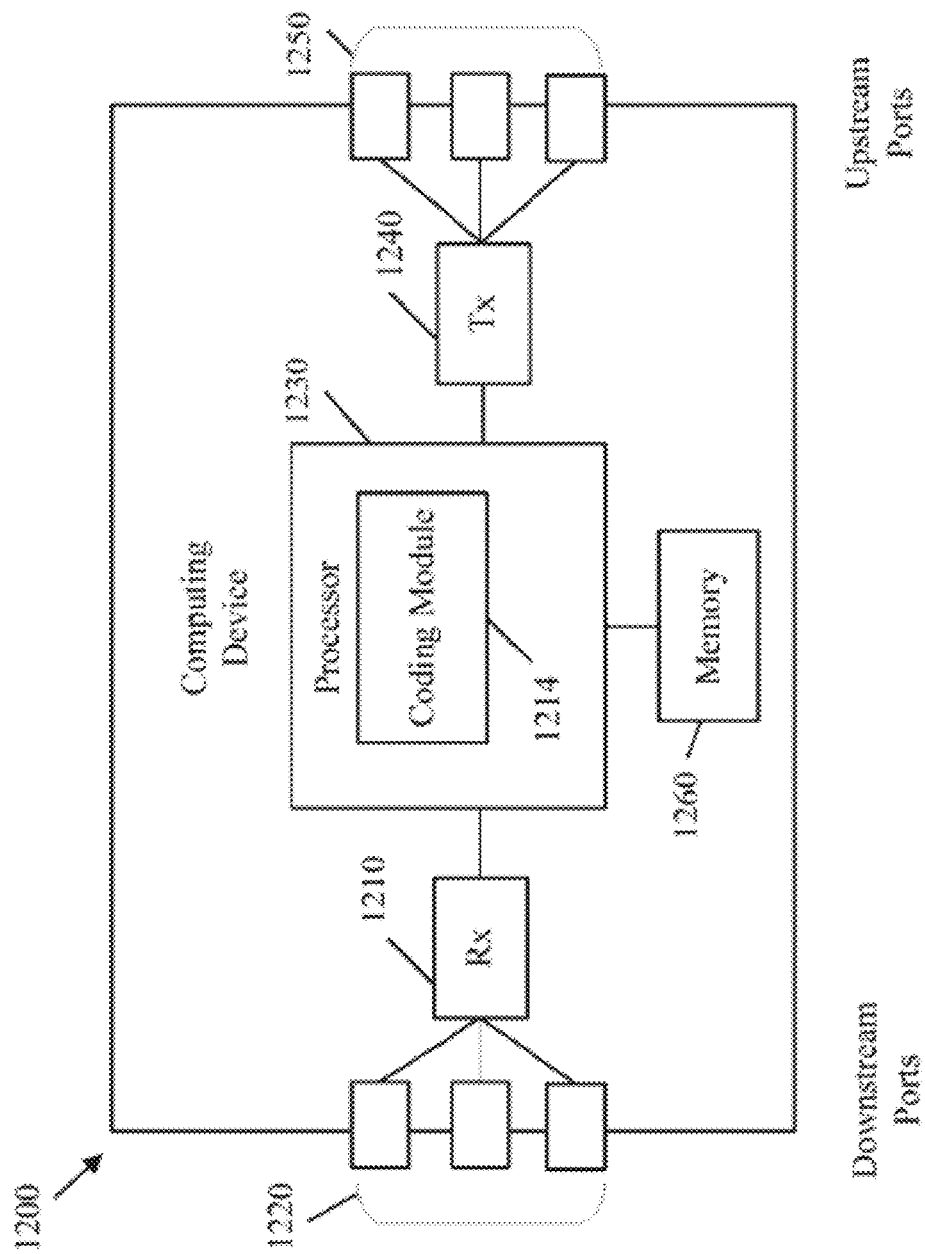
FIG. 12 is a schematic diagram of a computing device for video coding.

FIG. 12 is a schematic diagram of an example-computing device 1200 for video coding according to an embodiment of the disclosure. The computing device 1200 is suitable for implementing the disclosed embodiments as described herein. The computing device 1200 comprises ingress ports 1220 and receiver units (Rx) 1210 for receiving data; a processor, logic unit, or central processing unit (CPU) 1230 to process the data; transmitter units (TX) 1240 and egress ports 1250 for transmitting the data; a memory 1260 for storing the data. The computing device 1200 may also comprise optical-to-electrical (OE) components and electrical-to-optical (EO) components coupled to the ingress ports 1220, the receiver units 1210, the transmitter units 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field programmable gate arrays (FPGAs), application specific integrated circuits (ASICs), and digital signal processors (DSPs). The processor 1230 is in communication with the ingress ports 1220, receiver units 1210, transmitter units 1240, egress ports 1250, and memory 1260. The processor 1230 comprises a coding module 1214. The coding module 1214 implements the disclosed embodiments described above. For instance, the coding module 1214 implements, processes, prepare, or provide the various coding operations. The inclusion of the coding module 1214 therefore provides a substantial improvement to the functionality of the computing device 1200 and effects a transformation of the computing device 1200 to a different state. Alternatively, the coding module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a keyboard/mouse/trackball, etc. for user input.

Figure 13:
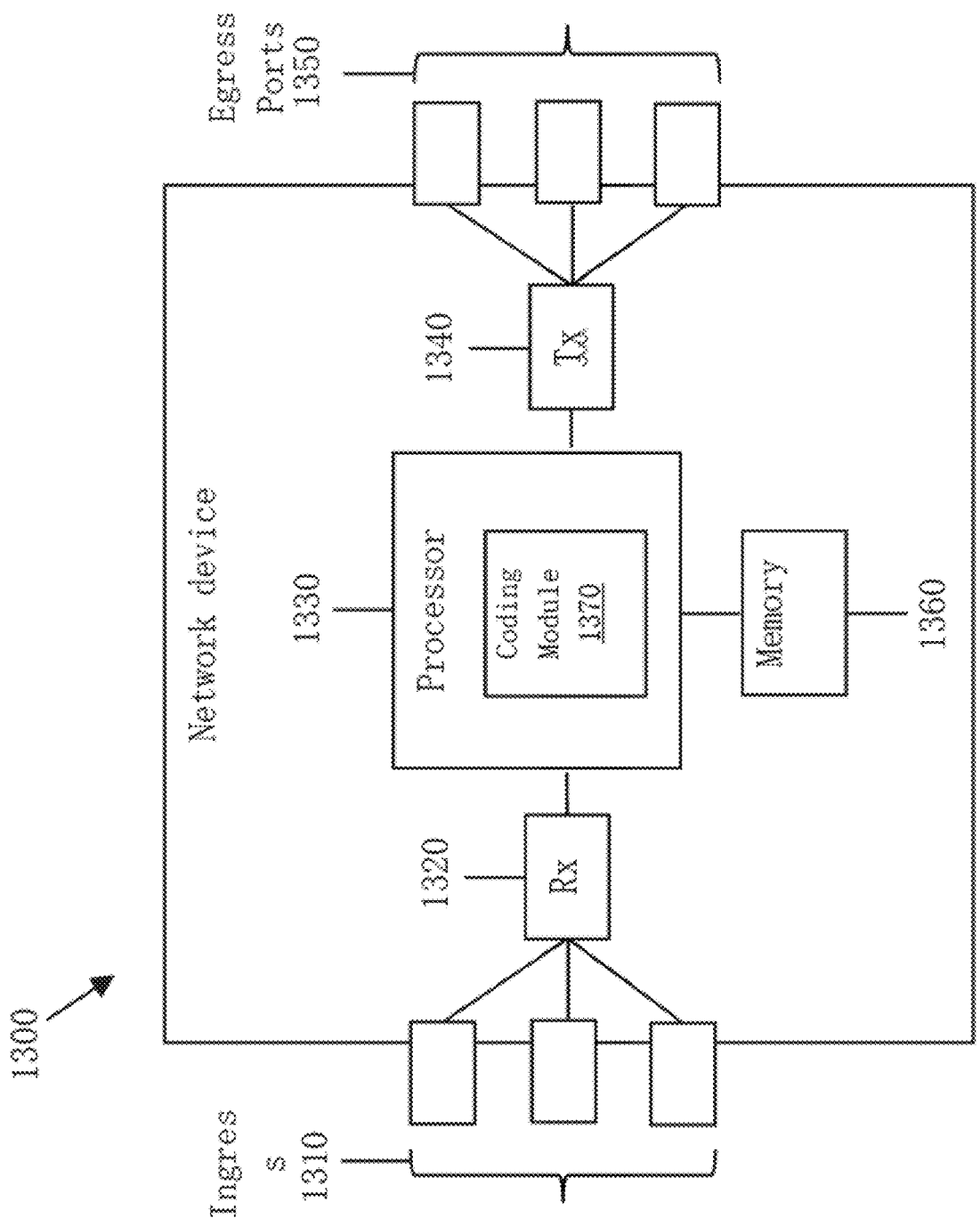
FIG. 13 is a schematic diagram of a network device according to an embodiment of the disclosure.

FIG. 13 is a schematic diagram of a network device 1300 (e.g., coding device) according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various coding functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

The following documents are incorporated by reference:
[1] G. J. Sullivan, J. Ohm, W.-J. Han, and T. Wiegand, "Overview of the high efficiency video coding (HEVC) standard," Circuits and Systems for Video Technology, IEEE Transactions on, vol. 22, no. 12, pp. 1649-1668, 2012.
[2] K. Suehring, X. Li, "JVET common test conditions and software reference configurations", JVET-B1010, San Diego, USA, February 2016.

This specification describes a system and method for selecting and ordering non-MPM modes based on probability statistics. The MPM modes that fall into selected category are coded using shorter codes and non-selected modes are coded using longer codes. The MPM modes can be used in encoding and decoding media.

The Joint Collaborative Team on Video Coding (JCT-VC), which was a partnership between Video Coding Experts Group (VCEG) and Moving Picture Experts Group (MPEG) for developing a new video coding standard, created the High Efficiency Video Coding (HEVC) standard in 2013. The HEVC showed a significant improvement when compared to that of H.264/Advanced Video Coding (AVC). Intra mode coding is one of the important aspects of video coding which has undergone a considerable change.

The H.264/AVC supported nine intra prediction modes. Out of these nine intra prediction modes, eight of the modes are angular prediction modes and one is DC mode. For example, the nine intra prediction modes include vertical, horizontal, DC, diagonal-down-left, diagonal-down-right, vertical-right, horizontal-down, vertical-left, and horizontal-up. Angular prediction uses pixels directly above and left to the current block. With increasing resolution and larger block sizes, eight directional modes were not sufficient for prediction. To improve directional prediction accuracy, HEVC came up with 35 intra prediction modes. 33 of the 35 prediction modes are angular prediction modes and the remaining two prediction modes include DC mode and Planar mode.

Intra prediction is typically performed on a video frame. In some examples, intra prediction is performed within intra-frame coding. Intra-frame prediction exploits spatial redundancy, e.g., correlation among pixels within one particular video frame, by calculating prediction values through extrapolation from already coded pixels for effective coding changes, such as delta coding. In particular, intra frame coding refers to the fact that the various lossless and lossy compressions techniques are performed relative to information that is contained only within the current frame, and not relative to any other frame in the video sequence. In other words, no temporal processing is performed outside of the current picture or frame. Intra frame coding initially begins by receiving data from a video camera or a video card, often the data is received in the YUV format, and processing the data into blocks, transforms, quantizing the data to be encoded, and subsequently, transmitted. In intra prediction, pixel values are determined based on adjacent blocks within the frame.

During the course of the development of the HEVC standard, a number of methods were proposed for intra mode coding. The method that was adopted in the standard divides the 35 intra prediction modes into two categories—(i) three most probable modes (MPMs) and (ii) 32 remaining modes. The three MPMs are derived considering the modes of the prediction units (PUs) which are to the left and above of the current prediction unit (PU). If the current intra prediction mode is same as one of the three MPMs, the index of the current intra prediction mode is coded, using only one or two bits. If the current mode is among the remaining modes, a 5-bit fixed length code is used to signal the mode. Thus, this method uses fewer bits for transmitting modes with a higher probability and more bits for modes which have a lower probability. As compared to the single MPM method used in H.264/AVC, this method provides a 1.0% bjontegaard rate difference (BD) rate savings when tested for all intra configurations. The BD allows the measurement of the bitrate reduction offered by a code or codec feature, while maintaining the same quality as measured by objective metrics. The rate change is computed as the average percent difference in rate over a range of qualities.

In October 2015, the ITU-T VCEG and ISO/IEC MPEG agreed to collaborate together and formed the Joint Video Exploration Team (WET) with a goal of working for a possible future video coding standard. The Joint Exploration Model (JEM) is the reference software for the JVET group.

Because high-resolution video content is becoming more popular, a greater number of intra prediction modes are needed for accurate prediction and improved coding efficiency. The first version of the reference software—JEM1.0—defined 67 intra prediction modes. The three MPM-based method of HEVC was modified to a six MPM-based method in JEM to take into account the extended intra prediction modes. As such, these modes formed two categories—six most probable modes (MPMs), and 61 remaining non-MPM modes. The method of coding these intra prediction modes was kept similar to the method used in HEVC. If the current intra prediction mode was one among the six selected MPMs, its index was coded. Otherwise a fixed length code was used to signal one of the remaining modes.

With an increasing number of intra prediction modes, a greater number of bits are required to code them. As such, reducing the number of bits for intra mode coding is of high priority. At the second JVET meeting in February 2016, a method was proposed to further divide the remaining sixty-one non-MPM modes into two groups—the selected modes group and the non-selected modes group. According to this method, 16 selected modes are extracted from these non-MPM modes, leaving a remaining 45 modes. The leftover 45 modes fall into the non-selected category. Before this method was adopted, all remaining 61 modes were coded using a fixed length code. This method changed that. Now, a search is performed to check whether the current intra prediction mode is among the 16 selected modes. If found, the current intra prediction mode is signaled using a 4-bit fixed length code to the decoder. If the current intra prediction mode is among the non-selected modes, e.g., the 45 modes, a truncated binary code is used to signal the current mode. This method was adopted in the JEM test model.

The method described above operates as follows. After the six MPMs have been extracted, the remaining 61 modes are sorted and rearranged/mapped to have an index from zero to 60 as shown below.

{0, 1, 2, 3, 4, 5, 6, 7, 8, 9, 10 . . . 58, 59, and 60}.

These 61 modes are divided into two sets. The first set is obtained by selecting every fourth mode, and is called the selected modes set. The remaining modes form the non-selected modes set. A flag included in the bit stream indicates which category the current mode belongs. The index of the selected modes set and non-selected modes set is given below.

Selected modes (obtained by selecting every fourth mode)—{0, 4, 8, 12, 16, 20, . . . 60}.

Non-selected modes (remaining nodes)—{1, 2, 3, 5, 6, 7, 9, . . . 58, 59}.

One issue with this approach is that the criterion for deriving the selected modes (obtained by selecting every fourth mode) is not based on probability of occurrence. Rather, every fourth mode in the sorted list is extracted to be in that selected category. Because modes falling in a selected category are coded using a shorter code, it makes sense to select those modes which have a higher probability. Further, the 45 remaining modes are coded using truncated binary coding, which effectively further divides them into two smaller groups. The first part of these non-selected modes group contains 19 modes, and would be coded using a 5-bit code. The second part of these modes contains the last 26 modes. These would be coded using a 6-bit code.

Considering these facts, an improved method to code these intra prediction modes would be to arrange the modes as per their probability of occurrence and derive modes falling in each category, accordingly. The techniques described in this specification propose a new method which takes into consideration this fact. Probability statistics generated offline are used to rearrange all intra prediction modes. The rearranged order is then used to make a decision about the category the current intra prediction modes fall into, and as such, the number of bits that would be required to code this mode.

The coding of non-MPM modes remained unchanged in next several versions of the test model. There have been, however, proposals that deal with non-MPM mode coding.

A. Non-MPM Derivation Method 1

A new method to derive the selected modes set was proposed at the seventh JVET meeting in Geneva as JVET-G0060. This method considers all of the angular modes among the six MPMs. Because DC mode and Planar mode are always present in the MPM list, there would be exactly four angular modes in this list. These angular modes are then used to derive modes to be added in the selected mode category.

The derivation process is done by adding and subtracting an offset of 2 from these modes. When the list is exhausted and the 16 unique modes have not been found, the process continues with the modes in selected category as input. This iterative process continues till 16 unique angular modes are obtained. An example of this is given below.

TABLE 1

Example of selected modes set.

| | |
|---|---|
| MPM set | {0, 1, 50, 18, 2, 34} |
| Selected modes set | {48, 52, 16, 20, 65, 4, 32, 36, 46, 54, 14, 22, 63, 6, 30, 38} |
| Non-selected modes set | Others |

Using the example in the above table, angular modes 50, 18, 2, 34 from the MPM list are considered. The selected modes obtained by taking an offset of 2 iteratively would be: {48, 52, 16, 20, 65, 4, 32, 36, 46, 54, 14, 22, 63, 6, 30, 38}. This method used JEM 6.0 as an anchor and resulted in an overall 0.1% BD rate savings.

B. Non-MPM Derivation Method 2

At the eighth JVET meeting, another new method JVET-H0029 was proposed to derive the 16 selected modes from the remaining 61 non-MPM modes to improve coding efficiency.

In this method, the angular modes in the MPM list are considered and derivation of selected modes is done by adding and subtracting offsets of 1, 2, 3 and 4 to these angular modes. The number of derived modes obtained with respect to MPM index is given by (4, 3, 3, 2, 2, 2). This means that the first angular mode in the MPM list is used to derive plus 4 and minus 4 (total 8) modes, the second is used to derive plus 3 and minus 3 (total 6) modes, and so on. Only unique modes are added to the selected category and the process is carried out until 16 modes are obtained.

If even after this process, 16 unique modes are not obtained, default modes are added similar to 6-MPM derivation. This default order is defined as {2, 18, 34, 50, 66; 10, 26, 42, 58; 6, 14, 22, 30, 38, 46, 54, 62; 17, 19, 49, 51}.

This method uses JEM 7.0 as anchor and achieved 0.1% luma BD rate savings.

C. Probability Based Non-MPM Coding

To solve this problem, this disclosure presents a method to arrange and order intra prediction modes based on their probabilities of occurrence. This method generates a probability matrix by processing test streams offline. A total of 24 streams with 4 quantization parameter (QP) values (22, 27, 32, 37) were used for this processing. The matrix is generated when the current intra prediction mode is not one mode in the MPM list. Each column of this matrix is a candidate mode (mapped mode), while each row is a different intra prediction mode (non-MPM mapped modes from 0 to 60). Each cell [row, column] in this matrix contains the number of times a candidate (column) is equal to the current mode. The total occurrence of each candidate is then observed and the candidate list is sorted from most occurring candidate to least occurring candidate. Hence, this matrix gives the probabilities of a candidate being a non-MPM mode. This offline data, a candidate mode order, is used to make a decision on how the current mode is coded. Because the method of this disclosure uses JEM 7.0 as an anchor, the method to detect non-MPM modes used in offline processing is the same as the one used in JEM 7.0.

The candidates in this method are derived from the angular modes in the 6 MPM list. Because DC mode and Planar mode are always present in the MPM list, exactly 4 angular modes exist in the list. The candidates are offsets of these angular modes. Offsets of ±1, ±2, ±3, ±4 and ±5 are extracted, which results in 10 neighbors per angular mode. This gives a total of 40 candidates. Let the first four angular modes in the MPM list be denoted as MPM0, MPM1, MPM2 and MPM3, each a different angular mode The 40 candidates are then be named as follows:
MPM0+1, MPM0−1, MPM0+2, MPM0−2, MPM0+3, MPM−3, MPM0+4, MPM0−4, MPM0+5, MPM0−5.
MPM1+1, MPM1−1, MPM1+2, MPM1−2, MPM1+3, MPM1−3, MPM1+4, MPM1−4, MPM1+5, MPM1−5.
MPM2+1, MPM2−1, MPM2+2, MPM2−2, MPM2+3, MPM2−3, MPM2+4, MPM2−4, MPM2+5, MPM2−5.
MPM3+1, MPM3−1, MPM3+2, MPM3−2, MPM3+3, MPM3−3, MPM3+4, MPM3−4, MPM3+5, MPM3−5.
(1)

The order of these candidate modes, arranged from the highest to the lowest probability, as obtained from statistics is as follows:
MPM0−1, MPM0+1, MPM0+2, MPM0−2, MPM1−1, MPM1+1, MPM0+3, MPM1−2, MPM1+2, MPM0+4, MPM0−3, MPM0−4, MPM0+5, MPM1−3, MPM0−5, MPM1+3, MPM1−4, MPM1+4, MPM1−5, MPM1+5, MPM2+2, MPM2+1, MPM2−2, MPM2−1, MPM2−3, MPM2+3, MPM2+4, MPM2−4, MPM2−5, MPM2+5, MPM3−1, MPM3−2, MPM3+1, MPM3+2, MPM3−3, MPM3+3, MPM3+4, MPM3−4, MPM3+5, MPM−5
(2)

As shown above, 10 derived modes of MPM0 and 6 derived modes of MPM1 are included in the first 16 candidates of the ordered list with indexes from 0 to 15. Moreover, the remaining 4 derived modes of MPM1 have indexes from 16 to 19. In a word, 16 selected modes most likely can be decided from those derived mode of MPM0 and MPM1. Using this pre-defined order list, the non-MPM modes for each PU are arranged and coded accordingly.

The non-MPM modes include the selected modes set and the non-selected modes set. In JEM 7.0, the 45 modes in the non-selected category are coded using truncated binary coding. As such, they are divided into two groups. The first part of consist of 19 modes and they are signaled using 5-bit fixed length coding to the decoder. The second part consists of 26 modes which are signaled using 6-bit fixed length coding to the decoder.

Using this information, the method of this disclosure arranges the intra prediction modes in an array according to probability order or based on probability of occurrence, as derived above. This is done by generating an array consisting of all 67 intra prediction modes. The first 6 modes in this array are the most probable modes which have already been derived. The method to derive the first 6 most probable modes and their signaling remains unchanged from JEM 7.0. A total of 35 modes are chosen based on the pre-defined order list if needed. The first 16 form the selected modes set. When the current mode is not in the selected modes set, the next 19 form the first part of the non-selected modes group. If the selected mode set or the first part of the non-selected modes group is not complete after checking the pre-defined order list, a default mode order list is used. This list below is based on the probability statistics.

{50, 2, 18, 66, 54, 62, 34, 58, 10, 14, 6, 45, 22, 41, 49, 46, 26, 42, 30, 37, 11, 24, 3, 38, 33, 23, 28, 15, 25, 20, 19, 7, 35, 13, 43, 21, 12, 27, 29, 17, 32, 47, 4, 39, 44, 53, 55, 57, 56, 51, 8, 9, 16, 65, 31, 48, 40, 36, 5, 64, 61, 52, 60, 59, 63}  (3)

The remaining 26 modes are the second part of the non-selected modes group and fill up the end of the array. The current mode in the selected category is signaled using 4-bit fixed length code to the decoder. The current mode falling in the non-selected group of first 19 modes is coded using 5-bit fixed length coding. Finally the remaining last 26 are signaled or coded using 6-bit fixed length coding to the decoder. This is depicted in the table 2 below.

TABLE 2

Intra Prediction Mode Coding.

| Intra prediction modes | Code |
|---|---|
| First 6 modes | Unary code |
| Next 16 modes (selected) | 4-bit FLC |
| Next 19 modes (non-selected first part) | 5-bit FLC |
| Next 26 modes (non-selected second part) | 6-bit FLC |

The algorithm for intra mode coding operates as follows.
If current intra prediction mode is among 6 MPM
   Mode signaled using unary code with index 0 . . . 5
Else
   If current mode is among the next 16 selected modes
      Mode signaled using 4-bit FLC with index 0 . . . 15
   Else if current mode is among the next 19 modes
      Mode signaled using 5-bit FLC with index 0 . . . 18
   Else (current mode is among last 26 modes)
      Mode signaled using 6-bit FLC with index 19 . . . 44

Entropy coding uses shorter codes for information which has higher probability, and longer codes for information having lower probability. The method described in this specification takes advantage of this particular theory and as such, results in BD rate savings.

D. Experimental Results

The method proposed in this disclosure has been tested using the common test conditions (CTC) of the All Intra configuration and using JEM 7.0 as an anchor. For generating offline statistical data and for testing, 24 test video streams were used with four QP values (22, 27, 32, and 37).

Offline processing of these streams generated a table of probability data of previously described 40 candidates in (1), above. The previously described 40 candidates were then sorted to generate an order of candidates from highest probability to lowest probability in (2), described above.

Table 3 below shows the experimental results for our proposed method for the All Intra (AI) configuration. As compared to those of JEM 7.0, it shows a BD rate improvement of 0.13%.

TABLE 3

Experimental Results.

| | All Intra Main 10 Over JEM7.0 | | |
|---|---|---|---|
| Class | Y | U | V |
| A1 | −0.10% | −0.06% | −0.10% |
| A2 | −0.10% | −0.07% | −0.14% |
| B | −0.07% | −0.08% | −0.12% |
| C | −0.14% | −0.15% | −0.11% |
| D | −0.16% | 0.04% | 0.03% |
| E | −0.28% | −0.36% | −0.17% |
| Overall | −0.13% | −0.10% | −0.10% |

Class E streams show the most improvement, an average of 0.28% BD rate savings. Among class E streams, the stream "KristenAndSara" shows the highest BD rate reduction of 0.34%.

Class B, on the other hand, shows least improvement with an average value of 0.07% BD rate reduction. The gains for individual streams are shown below in Table 4.

TABLE 4

Per stream BD rate performance of the proposed method.

| | | All Intra Main 10 Over JEM7.0 | | |
|---|---|---|---|---|
| Class | Stream | Y | U | V |
| A1 | Tango2 | −0.17% | −0.06% | −0.12% |
| | Drums100 | −0.14% | −0.02% | −0.07% |
| | Campfire | −0.07% | −0.09% | −0.18% |
| | ToddlerFountain2 | −0.04% | −0.08% | −0.03% |
| A2 | CatRobot | −0.17% | −0.01% | −0.11% |
| | TrafficFlow | −0.05% | −0.21% | −0.11% |
| | DaylightRoad2 | −0.07% | −0.03% | −0.27% |
| | Rollercoaster2 | −0.09% | −0.01% | −0.06% |
| B | Kimono | −0.04% | −0.01% | 0.04% |
| | ParkScene | 0.00% | −0.02% | −0.05% |
| | Cactus | −0.11% | −0.16% | −0.23% |
| | BasketballDrive | −0.16% | −0.13% | −0.07% |
| | BQTerrace | −0.03% | −0.10% | −0.27% |
| C | BasketballDrill | −0.20% | −0.19% | −0.14% |
| | BQMall | −0.12% | −0.22% | −0.19% |
| | PartyScene | −0.06% | −0.09% | −0.03% |
| | RaceHorses | −0.18% | −0.09% | −0.09% |
| D | BasketballPass | −0.16% | 0.10% | 0.09% |
| | BQ Square | −0.04% | 0.16% | 0.23% |
| | BlowingBubbles | −0.19% | −0.08% | −0.21% |
| | RaceHorses | −0.24% | 0.00% | 0.01% |
| E | FourPeople | −0.24% | −0.36% | −0.09% |
| | Johnny | −0.27% | −0.35% | 0.04% |
| | KristenAndSara | −0.34% | −0.36% | −0.47% |
| Overall | | −0.13% | −0.10% | −0.10% |

E. Conclusion

In this disclosure, we propose a new method for coding the non-MPM modes in intra prediction. When the current mode is not one of the modes in the 6-MPM list, the four angular intra prediction modes in this MPM list are extracted. These are used to derive 40 candidates. A pre-defined order of these candidates, obtained with the help of probability statistics, is used to generate an ordered array of 67 intra prediction modes if needed. The first 6 modes in this array are the most probable modes, followed by 16 selected modes and 45 non-selected modes. The 16 selected modes are signaled using 4-bit fixed length coding to the decoder. The first 19 modes from the non-selected category are signaled using 5-bit fixed length coding, while the last 26 modes are signaled and coded using 6-bit fixed length coding to the decoder. When compared to those of JEM 7.0, this method shows a luma BD rate savings of 0.13%.

Embodiment 1

In this disclosure, when the current intra prediction mode is not one of modes of in the 6-MPM list, the first four angular modes are extracted, denoted as MPM0, MPM1, MPM2 and MPM3. Total 40 candidates are derived with offsets ±1, ±2, ±3, ±4 and ±5 as in (1). The number of candidates can be changed if using a different set of offsets. For example, if the set of offsets ±1, ±2, ±3, and ±4 is used, each angular mode will generate 8 candidates. This gives a total of 32 candidates.

Embodiment 2

In this disclosure, the ordered candidate list as in (2) was obtained from statistics by encoding a total of 24 streams with 4 quantization parameter (QP) values (22, 27, 32, 37). This ordered candidate list may be changed by using a different set of streams if necessary by keeping the same offline processing procedure as presented in this disclosure.

Embodiment 3

In this disclosure, a defaulted mode list as in (3) was employed to complete 16 selected modes or the first part of non-selected modes. Because this list is based on probability statistics of non-MPM intra prediction modes, it may be changed from a different set of training data. The method of the present disclosure needs only this list arranged from the highest to the lowest probability of defaulted modes.

Embodiment 4

In this disclosure, 16 selected modes are obtained from the ordered list (2) by removing duplicate modes. If even after checking the whole list, 16 unique modes are not obtained, the defaulted mode list as in (3) was employed. However, the list (3) can be earlier used as needed. For example, after checking the first 16 candidate modes in list (2), if the set of 16 selected modes is not completed the list (3) then is employed. In another example, the first 20 candidates in list (2) are checked and then list (3) is employed. It is noted that these first 20 candidates in list (2) consist of derived modes of MPM0 and MPM1.

Embodiment 5

In this disclosure, when the current intra prediction mode is not among 16 selected modes, the first part of non-selected modes (19 modes) is obtained by continuing to check the list (2). If not completed, the list (3) can be employed. If needed, list (3) can be earlier employed. For example, if the first 35 candidates in list (2) has been checked, the list (3) is used for completing instead of using the last 5 candidates in list (2).

Embodiment 6

In this disclosure, list (3) is used for completing 16 selected modes or the first part 19 non-selected modes. However, some default modes can be inserted into list (2). For example, the combined first 16 candidates are given as following.

MPM0−1, MPM0+1, MPM0+2, MPM0−2, MPM1−1, MPM1+1, MPM0+3, MPM1−2, MPM1+2, MPM0+4, MPM0−3, MPM0−4, 50, 2, 18, 66

The new features presented by this disclosure include, among others, the following.

First, four angular modes extracted from 6-MPM list are used. The four angular modes may be extracted from other MPM length lists.

Second, offsets of ±1, ±2, ±3, ±4 and ±5 are applied to four angular modes. A total of 40 candidates are then derived as in (1).

Third, an ordered candidate list (2) is obtained from an offline process, which may be based on the probability matrix or another form of offline processing. This list is arranged from the highest to the lowest probability statistics.

Fourth, the default mode list (3) is obtained from probability statistics of non-MPM intra prediction modes.

Fifth, 16 selected modes can be obtained from list (2). The list (3) can be used for completing.

Sixth, the first 16 or 20 candidates in list (2) are derived modes from MPM0 and MPM1. It indicates that 16 selected modes can be obtained not using candidates derived from MPM2 and MPM3. The list (3) can be earlier used for completing if needed.

Seventh, planar mode and DC mode are included in the first 6 candidates for deriving 6 MPM list. Similarly, some default modes {50, 18} or {50, 2, 18, 66} can be included in the first 16 candidates for deriving 16 selected modes.

Eighth, when the current mode is not one of selected modes, 19 first parts of non-selected modes are obtained by continuing to check the list (2). The list (3) can be earlier used for completing if needed.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10 percentage of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, by one or more processors, an intra-coding process applied to pixels in a frame of media;
   determining, by the one or more processors, whether the intra-coding process corresponds to at least one of most probable modes;
   in response to determining the intra-coding process does not correspond to the at least one of the most probable modes, extracting, by the one or more processors, four angular prediction modes from a list of prediction modes;
   determining, by the one or more processors, a set of candidate modes based on the four angular prediction modes; and
   determining, by the one or more processors, a pre-defined order of the set of candidate modes, wherein each candidate mode of the set of candidate modes is included in a ranked order and signaled with a particular fixed length coding, and wherein a length of the particular fixed length coding increases based on the pre-defined order of the set of candidate modes.

2. The computer-implemented method of claim 1, wherein the four angular prediction modes correspond to angular directions from a list of directional prediction modes.

3. The computer-implemented method of claim 1, wherein determining the pre-defined order of the set of candidate modes further comprises:
   generating, by the one or more processors, a statistical matrix for the pre-defined order in response to determining the intra-coding process does not correspond to the at least one of the most probable modes.

4. The computer-implemented method of claim 3, wherein the generated statistical matrix further comprises:
   applying, by the one or more processors, the candidate mode to each column of the statistical matrix;
   applying, by the one or more processors, a different intra prediction mode to each row of the statistical matrix, wherein the different intra prediction mode corresponds to one of sixty one non-most probable modes; and
   applying, by the one or more processors, a number of times each of the candidate modes corresponds to a current mode for previous frames of media to each cell in the statistical matrix.

5. The computer-implemented method of claim 4, wherein determining the pre-defined order of the set of candidate modes comprises:
   summing, by the one or more processors, the number of times each of the candidate modes corresponds to the current mode for each candidate mode; and
   sorting, by the one or more processors, the candidate modes based on most occurring candidate mode to a least occurring candidate mode.

6. The computer-implemented method of claim 1, wherein determining the pre-defined order of the set of candidate modes comprises:
   signaling, by the one or more processors, each candidate mode of the set of candidate modes in the ranked order with the particular fixed length coding to a decoder for decoding the frame of media.

7. The computer-implemented method of claim 1, wherein the at least one of the most probable modes comprise a DC mode and a planar mode.

8. The computer-implemented method of claim 1, wherein the length of the particular fixed length coding increases based on the pre-defined order of the set of candidate modes and comprises four bits, five bits, and six bits.

9. A system comprising one or more computers and one or more storage devices storing instructions that are operable, when executed by the one or more computers, to cause the one or more computers to perform operations comprising:
   determining, by one or more processors, an intra-coding process applied to pixels in a frame of media;
   determining, by the one or more processors, whether the intra-coding process corresponds to at least one of most probable modes;
   in response to determining the intra-coding process does not correspond to the at least one of the most probable modes, extracting, by the one or more processors, four angular prediction modes from a list of prediction modes;
   determining, by the one or more processors, a set of candidate modes based on the four angular prediction modes; and
   determining, by the one or more processors, a pre-defined order of the set of candidate modes, wherein each candidate mode of the set of candidate modes is included in a ranked order and signaled with a particular fixed length coding, and wherein a length of the particular fixed length coding increases based on the pre-defined order of the set of candidate modes.

10. The system of claim 9, wherein the four angular prediction modes correspond to angular directions from a list of directional prediction modes.

11. The system of claim 9, wherein determining the pre-defined order of the set of candidate modes further comprises:
   generating, by the one or more processors, a statistical matrix for the pre-defined order in response to determining the intra-coding process does not correspond to the at least one of the most probable modes.

12. The system of claim 11, wherein the generated statistical matrix further comprises:
   applying, by the one or more processors, the candidate mode to each column of the statistical matrix;

applying, by the one or more processors, a different intra prediction mode to each row of the statistical matrix, wherein the different intra prediction mode corresponds to one of sixty one non-most probable modes; and applying, by the one or more processors, a number of times each of the candidate modes corresponds to a current mode for previous frames of media to each cell in the statistical matrix.

13. The system of claim 12, wherein determining the pre-defined order of the set of candidate modes comprises:

summing, by the one or more processors, the number of times each of the candidate modes corresponds to the current mode for each candidate mode; and sorting, by the one or more processors, the candidate modes based on most occurring candidate mode to a least occurring candidate mode.

14. The system of claim 9, wherein determining the pre-defined order of the set of candidate modes signaling each candidate mode of the set of candidate modes in a ranked order with a particular fixed length coding comprises:

signaling, by the one or more processors, each candidate mode of the set of candidate modes in the ranked order with the particular fixed length coding to a decoder for decoding the frame of media.

15. The system of claim 9, wherein the at least one of the most probable modes comprise a DC mode and a planar mode.

16. The system of claim 9, wherein the length of the particular fixed length coding increases based on the pre-defined order of the set of candidate modes and comprises four bits, five bits, and six bits.

17. One or more non-transitory computer-readable media comprising instructions stored thereon that are executable by one or more processing devices and upon such execution cause the one or more processing devices to perform operations comprising:

determining, by one or more processors, an intra-coding process applied to pixels in a frame of media;

determining, by the one or more processors, whether the intra-coding process corresponds to at least one of most probable modes;

in response to determining the intra-coding process does not correspond to the at least one of the most probable modes, extracting, by the one or more processors, four angular prediction modes from a list of prediction modes;

determining, by the one or more processors, a set of candidate modes based on the four angular prediction modes; and determining, by the one or more processors, a pre-defined order of the set of candidate modes, wherein each candidate mode of the set of candidate modes is included in a ranked order and signaled with a particular fixed length coding, and wherein a length of the particular fixed length coding increases based on the pre-defined order of the set of candidate modes.

18. The one or more non-transitory computer-readable media of claim 17, wherein the four angular prediction modes correspond to angular directions from a list of directional prediction modes.

19. The one or more non-transitory computer-readable media of claim 17, wherein determining the pre-defined order of the set of candidate modes further comprises:

generating, by the one or more processors, a statistical matrix for the pre-defined order in response to determining the intra-coding process does not correspond to the at least one of the most probable modes.

20. The one or more non-transitory computer-readable media of claim 17, wherein the generated statistical matrix further comprises:

applying, by the one or more processors, the candidate mode to each column of the statistical matrix;

applying, by the one or more processors, a different intra prediction mode to each row of the statistical matrix, wherein the different intra prediction mode corresponds to one of sixty one non-most probable modes; and applying, by the one or more processors, a number of times each of the candidate modes corresponds to a current mode for previous frames of media to each cell in the statistical matrix.

* * * * *